United States Patent [19]

Johansson et al.

[11] Patent Number: 4,934,130
[45] Date of Patent: Jun. 19, 1990

[54] MOWER

[75] Inventors: Rolf A. G. Johansson, Partille; Tore V. Claesson, Kinna; Dan L. Nilsson, Sjuntorp, all of Sweden

[73] Assignee: Husqvarna Aktiebolag, Huskvarna, Sweden

[21] Appl. No.: 310,604

[22] Filed: Sep. 28, 1988

Related U.S. Application Data

[63] Continuation of Ser. No. 909,021, Jan. 18, 1986, abandoned.

[30] Foreign Application Priority Data

Sep. 27, 1985 [SE] Sweden ................................. 8504493

[51] Int. Cl.$^5$ ........................................... A01D 34/74
[52] U.S. Cl. ........................................ 56/17.2; 56/6; 56/15.9
[58] Field of Search .................. 56/6, 10.4, 15.2, 15.9, 56/17.1, 17.2, 16.1, 208, DIG. 22

[56] References Cited

U.S. PATENT DOCUMENTS

| | | | |
|---|---|---|---|
| 3,245,209 | 4/1966 | Marek | 56/13.6 |
| 3,796,028 | 3/1974 | Federspiel | 56/DIG. 22 |
| 3,874,150 | 4/1975 | Boeck | 56/17.1 |
| 4,084,395 | 4/1978 | Nannen | 56/17.2 |
| 4,120,136 | 10/1978 | Rose | 56/DIG. 22 |
| 4,320,616 | 3/1982 | Marto | 56/17.2 |
| 4,442,660 | 4/1984 | Kuhn | 56/DIG. 22 |
| 4,551,967 | 11/1985 | Murcko | 56/11.3 |
| 4,563,019 | 1/1986 | Kuhn et al. | 56/DIG. 22 |
| 4,577,455 | 3/1986 | Amano et al. | 56/17.1 |
| 4,663,923 | 5/1987 | Boice | 56/DIG. 22 |

*Primary Examiner*—John Weiss
*Attorney, Agent, or Firm*—Pearne, Gordon, McCoy & Granger

[57] ABSTRACT

This invention relates to a riding mower comprising a chassis supporting a driving unit intended to propel the wheels of the mower as well as a cutting attachment, the cutting attachment being movably fastened to the chassis and by means of an operating device can be brought from a lower cutting position to an upper non-cutting position. The cutting attachment has an upper and a lower displacement area, the engagement and disengagement of the cutting attachment being effected in the upper area, whereas the cutting attachment in the lower area can be moved upwards or downwards with its parallelism with the ground preserved and can be locked against downwards movement for different cutting heights. The mower is driven while the cutting attachment is in the lower displacement area.

8 Claims, 3 Drawing Sheets

MOWER

This application is a continuation of application Ser. No. 909,021, filed 9/18/86, now abandoned.

BACKGROUND OF THE INVENTION

This invention relates to a riding mower comprising a chassis supporting a driving unit intended to propel the wheels of the mower as well as having a cutting attachment, the cutting attachment being movably fastened to the chassis and by means of an operating device can be brought from a lower cutting position to an upper non cutting position.

Mowers of the above type are known, the operating device usually being a bar or handle which is moved between two different positions, one position corresponding to a tilted up position of the cutting attachment and the other corresponding to a cutting position. Moreover, for engagement and disengagement respectively, of the driving of the cutting attachment there is a separate bar or handle. In order to adjust the cutting height for this type of machine another bar is used which is fastened to the cutting attachment. Thus, the operator is forced to stop the machine and get off it in order to adjust the cutting height which of course is so troublesome that adjustment during cutting of a lawn is not effected other than in exceptional cases. It has however proved that it is comparatively often desirable to adjust the cutting height during cutting i.e. to raise the cutting attachment without tilting it for instance when passing minor obstacles in a lawn. At the same time it should be possible to tilt a front mounted cutting attachment so that the front edge of the attachment at an upwards sloping surface does not engage the ground. The present invention offers a solution to this problem.

A further advantage of a device according to the invention is that the bar for adjusting the cutting height and the engagement and disengagement of the cutting attachment are intergrated in the same unit which makes it very easy to operate the machine.

BRIEF DESCRIPTION OF THE DRAWINGS

An embodiment of the invention will now be described with reference to the accompanying drawings where.

DESCRIPTION OF THE PREFERRED EMBODIMENT

Figure 1:
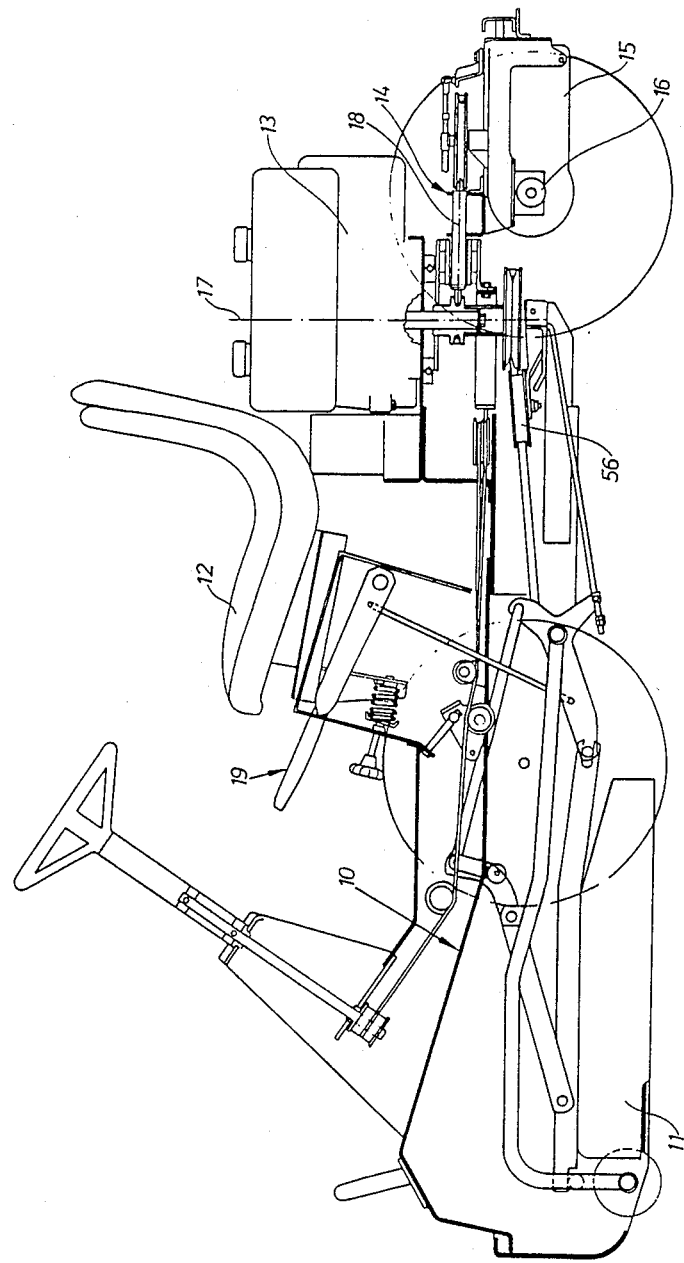
FIG. 1 is a schematic vertical section of a device according to the invention.

As appears from the figures the mower comprises a front chassis section 10 supporting a cutting attachment 11 a seat 12 and a driving unit 13 and a rear chassis section 14 supporting a gear box 15 and a rear shaft 16. The front and the rear section are pivotally connected to each other and can be turned about a common vertical axis 17. Moreover the rear section is so designed that it can swing about a horizontal axis 18. At the seat there is a bar or handle 19. The bar acts on the cutting attachment 11 by means of a link arm mechanism described below so that it can be positioned in different cutting heights as well as be moved from a cutting to a non-cutting position.

Figure 3:
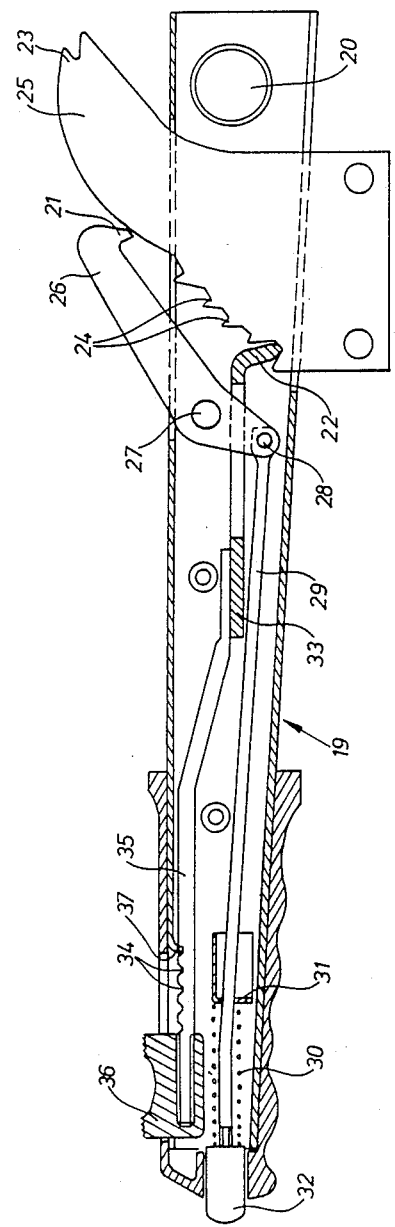
FIG. 3 is a section of the operating device.

The bar 19 (see FIG. 3) can be turned about a pivot point or dowel 20 and comprises two hooks 21 and 22 respectively which can be brought into engagement with teeth 23 and 24 respectively on a plate 25 fixed to the chassis. The hook 21 is placed at one end of a rocker arm 26 which turns about a pivot point or dowel 27 which is fixed to the bar 19. The other end of the rocker arm is at a point 28 turnably connected to a rod 29 which is under the influence of a spring 30. This spring in turn pushes the hook 21 towards the plate 25. The spring is clamped between a bracket 31 on the bar 19 and a knob 32 screwed to the rod. Thus, by means of the knob 32 the hook 21 can be acted on so that it disengages from the tooth 23.

The hook 22 is a bent outer part of a plate 33 which continues into a slide 35 which is provided with several recesses 34, the slide being movable in the direction of the bar by means of a knob 36. The slide 35 can be locked in certain positions since a tongue 37 on the bar 19 engages one of the ressesses 34. Thus, by means of the knob 36 the hook 22 can be positioned so that it engages a suitable tooth 24.

Figure 2:
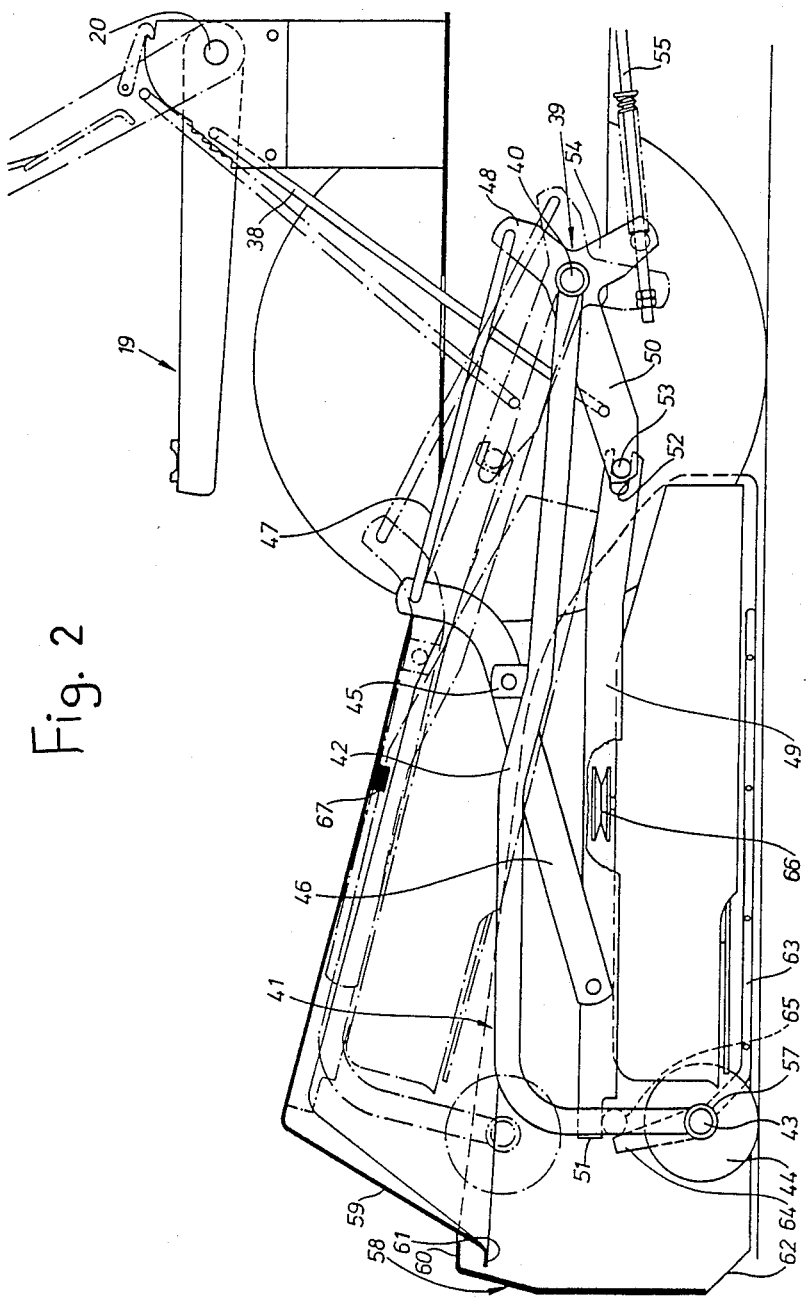
FIG. 2 is a vertical section of the support of the cutting attachment.

As seen in FIG. 2, the bar which is placed at one side of the chassis is by means of a draw bar 38 connected to a three armed follower 39 which is connected to a shaft 40 which is turnably fastened to the chassis. On the opposite side of the chassis this shaft supports another follower (not shown) intended to act on the type of link arm mechanism which will be described with reference to the figures.

The shaft 40 also supports a mainly U-shaped yoke 41 comprising two parallel pipes 42 placed one on each side of the cutter attachment. These pipes are turnably fastened to the shaft 40. The pipes have a horizontal inner part and a vertical outer part and are via a pipe 43 connected to each other, the pipe 43 serving as a bearing for several rollers 44 which are intended to rest on the ground during cutting.

The pipes 42 each have an ear 45 to which an angled link arm 46 is turnably fastened. One end of the link arm 46 supports a draw bar 47 the other end of which is connected to a first arm 48 of the three arm follower 39. The other end of the link arm 46 is turnably fastened to a lever 49 extending between the vertical part of the pipe 42 and a second arm 50 of the follower 39. The end of the link arm 50 which is in touch with the pipe 42 is shaped as a fork 51 and intended to slide on the pipe whereas its second end has a slot 52 in which a dowel 53 of the second arm 50 slides. The third arm 54 of the follower is via a drawbar 55 connected to a tension roller 56 (FIG. 1) in order to act on a belt, (not shown in detail), running between the driving unit and the cutting attachment.

The yoke 41 has at its front part a fastening means 57 by means of which a guard 58 preferably of plastics is fastened to the yoke. The guard is mainly U-shaped and covers the front side of the cutting attachment as well as its sides. The upper part of the guard is placed closely outside a steel plate 59 on the chassis and has a flange 60 which in a lower position engages a flange 61 on the steel plate 59. At the lower part of the guard there is at its front end an opening 62 which means that small objects do not hinder the movement of the mower. At the lower side part of the guard and at its inside there is a pipe 63 which is fixed to the guard. This pipe is bent and turnably fastened to the pipe 43 by means of the fastening means 57 which means that the guard follows the movement of the rollers on the ground during cutting. The fastening means 57 also supports a turning stop 64 keeping the guard parallel to ground by cooperation with the stay 65 extending between the vertical parts of the pipe 42.

The cutting attachment has several pulleys 66 each driving a blade in the cutter attachment and the chassis has a corresponding number of braking rubber blocks 67. These blocks are placed so that they engage the pulleys when the cutting attachment is swung to its inactive upper position that is the dash dotted position shown in FIG. 2. These blocks also are a spring support for the cutting attachment in its upper position by means of which rattling and noise is avoided when the mower is driven.

The device operates in the following way.

In its disconnected position the bar 19 is mainly vertical and the hook 21 engages the tooth 23 of the plate 25. In order to set the cutting height in a suitable position the knob 36 is depressed which means that the slide 35 disengages from tongue 37 so that it can be moved in the direction of the bar. Then the hook 22 is also moved in the length direction of the bar so that the hook 22 when moving the bar forwards downwards in FIG. 2 engages one of the teeth 24 of the plate 25 thereby preventing the bar 19 from being moved further forwards. For moving the cutting attachment to cutting position the hook 21 is moved out of engagement with the tooth 23 by acting on the knob 32.

When the bar disengages it will because of the weight of the cutting attachment be folded forwards which means that the drawbar 38 turns the follower counterclockwise in FIG. 2. This movement means that the lever 49 disengages and can be moved downwards in the figure. The yoke 41 which in the original position with its front part rests on the fork 51 of the lever 49 thereby turns about the shaft 40 until the rollers 44 engage the ground. Further movement forwards of the bar 19 now means that the lever 49 with the cutter attachment fastened to it is moved straight downwards in the figure under the influence of the link arm 46, drawbar 47 and follower 39 at the same time as the fork 51 is moved along the vertical part of the pipe 42. The downward movement of the bar is then stopped by the hook 22 in the way which has been described above. The guard 57 which is directly connected to the yoke 41 of course follows the movement described above. At the same time the belt drive (not shown) of the cutting attachment is engaged because the tension roller connected to the drawbar 55 tensions the belt between engine and cutting attachment.

The preset cutting height is maintained by means of the rollers 44 and any ridges or recesses of the lawn causing a corresponding increase or decrease of the cutting height depending on that the rear part of the level 49 is kept at a certain distance from the ground whereas the front part of the lever is subject to the changes of the ground level.

In order to increase the cutting height during movement for instance when passing an obstacle, the bar 19 is drawn upwards in FIG. 2 which causes the cutting attachment to be lifted straight upwards. When the obstacle has been passed it is possible to return to the original cutting height by releasing the bar so that it returns to the original position. If a more permanent change of the cutting height is desired the knob 36 is moved in a way which has been described above before the bar 19 is again released.

In the way described above a parallel movement of the cutting attachment is achieved for setting the different cutting heights in the lower region of the moving path of the cutting attachment whereas this movement at the upper region of the moving path of the cutting attachment continues into a turning movement.

We claim:

1. A riding mower comprising a chassis, a driving unit and a cutting attachment mounted on said chassis, said driving unit being capable of driving the wheels of said riding mower and said cutting attachment, an operating device for moving said cutting attachment from a lower cutting position in a lower displacement area to an upper non-cutting position in an upper displacement area and vice versa, means co-acting with said cutting attachment when the latter is in the lower displacement area for moving said cutting attachment upwardly or downwardly in substantial parallelism with the ground, means on said chassis with a plurality of teeth, said operating device comprising a rod and a slide member each having a free end and a hook at the respective free end, the hook on said rod being releasably engaged in one tooth for locking the cutting attachment in an upper non-cutting position, the hook on said slide member being engaged in a selected tooth to establish the cutting height of said cutting attachment, and when said operating device is moved in order to lift the cutting attachment said hook on said slide member is disengaged from the selected tooth and the cutting attachment is elevated, and when said operating device is moved to lower the cutting attachment said hook on said slide member becomes engaged with said selected tooth whereby said cutting attachment automatically stops at its selected height, said operating device thus permitting movement of said cutting attachment in an upward direction to clear an obstacle while returning said cutting attachment to the original selected cutting height after clearing said obstacle.

2. A mower as claimed in claim 1 wherein said cutting attachment is mounted on the front of said chassis and is capable of rotational movement in said upper displacement area.

3. A mower as claimed in claim 1 further comprising a force transmission means, a plurality of followers and a link arm mechanism whereby said operating device through said force transmission means is connected to a selected one of said followers and which through said link arm mechanism acts on said cutting attachment.

4. A mower as claimed in claim 3 wherein said link arm mechanism further comprises a support means and rollers on said support means whereby said cutting attachment is supported by said rollers during cutting.

5. A mower as claimed in claim 4 further comprising means for rotatably coupling said support means on a location on said chassis behind said cutting attachment.

6. A mower as claimed in claim 5 further comprising a lever, and said support means via said link arm mechanism supports said lever on which the cutting attachment is connected, and said lever being movably secured relative to said support means, and the lever and the link arm mechanism being connected to one of said followers.

7. A mower as claimed in claim 1 further comprising a brake member, and said cutting attachment cooperating with said brake member whereby when said cutting attachment is moved to the upper displacement area the blades of said cutting attachment is stopped from movement.

8. A mower as claimed in claim 7 further comprising a plurality of pulleys and wherein said brake member is a rubber block secured to said chassis whereby said block in the upper position of said cutting attachment engages said pulleys driving the blades of said cutting attachment.

* * * * *